(12) United States Patent
Frederiksen et al.

(10) Patent No.: US 7,940,795 B2
(45) Date of Patent: May 10, 2011

(54) SIGNALING LIMITATION OF MULTIPLE PAYLOAD SIZES FOR RESOURCE ASSIGNMENTS

(75) Inventors: Frank Frederiksen, Klarup (DK); Lars Lindh, Helsinki (FI); Jussi Ojala, Helsinki (FI); Samuli Visuri, Helsinki (FI)

(73) Assignee: Nokia Corporation, Espoo (FI)

( * ) Notice: Subject to any disclaimer, the term of this patent is extended or adjusted under 35 U.S.C. 154(b) by 90 days.

(21) Appl. No.: 12/286,106

(22) Filed: Sep. 26, 2008

(65) Prior Publication Data

US 2009/0103562 A1 Apr. 23, 2009

Related U.S. Application Data

(60) Provisional application No. 60/975,278, filed on Sep. 26, 2007.

(51) Int. Cl.
*H04J 3/16* (2006.01)

(52) U.S. Cl. ...... 370/468; 370/242; 370/252; 455/452.1

(58) Field of Classification Search ............... 370/468, 370/242, 252; 455/452.1
See application file for complete search history.

(56) References Cited

U.S. PATENT DOCUMENTS

| 2008/0305745 A1* | 12/2008 | Zhang et al. | 455/67.11 |
| 2010/0098020 A1* | 4/2010 | Kim et al. | 370/330 |

OTHER PUBLICATIONS

International Search Report (6 pages) and Written Opinion (9 pages) of the International Searching Authority issued on parallel International Application No. PCT/IB2008/002527, Mar. 23, 2009.
XP-002518868 3GPP TSG RAN1 #49; RI-027607 (RI-072168); Agenda Item 7.13.1; 3$^{rd}$ Generation Partnership Project; Title: Efficient structure for aggregating 1, 2, [3], 4, 8 DL control channel elements; Kobe, Japan; May 7-11, 2007 (5 pages).
XP-002518869 3GPP TSG RAN WG1 Meeting #48 bis; RI-071683; Agenda Item 7.11.2; 3$^{rd}$ Generation Partnership Project; Title: Tree Structure for the DL Control Channel; St. Julian's, Malta; Mar. 26-30, 2007 (3 pages).
XP-002518870 3GPP TSG-RAN WG1 Meeting #50; RI-073456; Agenda Item 7.2.3; 3$^{rd}$ Generation Partnership Project; Title: DL Control Channel Structure: CCE Aggregation and Blind Detections; Athens, Greece, Aug. 20-24, 2007 (6 pages).
XP-002518871 3GPP TS 36.212 v 2.0.0 (Sep. 2007); 3$^{rd}$ Generation Partnership Project; Title: "Technical Specification Group Radio Access Network; Evolved Universal Terrestrial Radio Access (E-UTRA); Multiplexing and channel coding;" (Release 8); Sep. 1, 2007 (6 pages).
XP-002518872 3GPP TSG-RAN WG1 Meeting #51; (RI-074317); RI-074870; Agenda Item 6.2.3; 3$^{rd}$ Generation Partnership Project; Title: "Reducing the decoding complexity of the PDCCH;" Jeju, Korea, Nov. 5-9, 2007 (8 pages).

(Continued)

*Primary Examiner* — Ricky Ngo
*Assistant Examiner* — Luat Phung (57) ABSTRACT

Introducing a set of limitations on where different payload sizes are allowed in a control channel element aggregation 'tree' is shown. Following these limitations, the network element (e.g. Node B) will have a large flexibility for scheduling users, while the terminal (e.g. User Equipment) will have an option for still keeping the number of blind decoding attempts at a quite low number.

28 Claims, 3 Drawing Sheets

OTHER PUBLICATIONS

3GPP TS 36.211 V1.2.0 (Jun. 2007) "3$^{rd}$ Generation Partnership Project; Technical Specification Group Radio Access Network; Physical Channels and Modulation (Release 8)", 44 pages.

3GPP TS 36.212 V1.3.0 (Jul. 2007) "3$^{rd}$ Generation Partnership Project; Technical Specification Group Radio Access Network, Multiplexing and channel coding (Release 8)", 20 pages.

3GPP TS 36.213 V1.2.0 (May 2007) "3$^{rd}$ Generation Partnership Project; Technical Specification Group Radio Access Network; Physical layer procedures (Release 8)", 10 pages.

3GPP TS 36.201 V1.2.0 (Jun. 2007) "3$^{rd}$ Generation Partnership Project; Technical Specification Group Radio Access Network; LTE Physical Layer—General Description (Release 8)", 12 pages.

* cited by examiner

SIGNALING LIMITATION OF MULTIPLE PAYLOAD SIZES FOR RESOURCE ASSIGNMENTS

CROSS-REFERENCE TO RELATED APPLICATION

This application claims domestic priority under 35 U.S.C. §119(e) from U.S. Provisional Application Ser. No. 60/975,278 filed Sep. 26, 2007.

BACKGROUND

1. Technical Field

The disclosure relates to communications and, more particularly, to signaling of resource allocations.

2. Discussion of Related Art

Abbreviations
3GPP Third generation partnership project
BPSK Binary Phase Shift Keying
CDM Code Division Multiplexing
CP Cyclic Prefix
CRC Cyclic Redundancy Check
eNode-B Evolved Node B
E-UTRAN Evolved-UTRAN
FEC Forward Error Correction
FDD Frequency Division Duplex
FDPS Frequency Domain Packet Scheduling
FDMA Frequency Division Multiple Access
HARQ Hybrid Automatic Repeat Request
LTE Long Term Evolution
MAC Medium Access Control
MIMO Multiple Input Multiple Output
OFDM Orthogonal Frequency Division Multiplexing
OOK On-off keying
PBCH Physical Broadcast Channel
PCFICH Physical Control Format Indicator Channel
PDSCH Physical Downlink Shared Channel
PDCCH Physical Downlink Control Channel
PHICH Physical Hybrid ARQ Indicator Channel
PMCH Physical Multicast Channel
PRACH Physical Random Access Channel
PUCCH Physical Uplink Control Channel
PUSCH Physical Uplink Shared Channel
Q Quadrature
QAM Quadrature Amplitude Modulation
QPSK Quadrature Phase Shift Keying
RACH Random Access Channel
RLC Radio Link Control
RR Resource Request
RRC Radio Resource Control
RSSI Received Signal Strength Indicator
RSRP Reference Signal Received Power
RSRQ Reference Signal Received Quality
SAP Service Access Point
SC-FDMA Single-Carrier Frequency Division Multiple Access
SF Spreading Factor
SNR Signal to Noise Ratio
SR Scheduling Request
TDD Time Division Duplex
TTI Transmission Time Interval
UL Uplink
UTRAN Universal Terrestrial Radio Access Network Control signaling is known in general and serves many purposes in communications systems. Such may include signaling the allocation of communication resources made between a network element and a plurality of terminals. Each terminal may have a constant or varying need for communicating data with the network element in either direction. To distribute the data there may be a need to protect against time-varying adverse communication channel conditions by allocating the data intended for a given terminal to various communication resource elements that are dynamically changed in various domains such as time, frequency and space.

Both the control signaling and the data can be dynamically allocated in this way within various bandwidths. In other words, it can be the case that a certain amount of resources is set aside for signaling and another corresponding amount of resources for data. To give such a system more flexibility, it can be the case that a plurality of certain resources is designed for signaling and another plurality of corresponding resources is designed for data. A pair of a signaling resources and a data resources would be chosen and set aside for use by a particular network element and associated terminals for a particular circumstance. In the above discussion the term resources refers to a set of physical resources which are to be transmitted over an interface. This interface could for instance be a wireless air interface. The physical resources could be, but is not limited to, for instance a set of sub-carrier symbols in an OFDM system. Aspects of the physical layer of an exemplary Radio Access Network that uses OFDM are described in 3GPP TS 36.201 V1.2.0 (2007 June), TS 36.211 V1.2.0 (2007 June), 36.212 V1.3.0 (2007 July) and 36.213 V1.20 (2007 May). See for instance the Frame structure in section 4, the Downlink of section 5 (a downlink resource grid is shown in FIG. 3), and the Uplink of Section 6 (two uplink slot formats shown in FIGS. 15 and 16) of 3GPP TS 36.211 V1.2.0 (2007 June).

For example, in case of a direction from the network element to the terminals and assuming the signaling/data bandwidth pair is chosen and known at both the network element and the associated terminals, the network element could send resource allocation signaling to all of the terminals in such a way that each terminal can locate its own allocation information so that it can subsequently obtain information on how to find, demodulate, and decode data also sent from the network element to all terminals but each terminal only extracts the information that is specifically intended for it. Such a one-to-many communication scenario requires that a search of the control signaling be conducted by each terminal for a pointer to the placement of the resource element or elements containing its data that is about to be sent from the network element.

It can be the case that the network element is in possession of identifying information concerning each associated terminal and can use such information to designate which control and data resource elements belong to a given terminal. Since the terminal will be in possession of its own identifier as well, it can search the control signaling resources to find its control information and each other terminal can do the same. Once the pointers are obtained in this way, the terminals can find their data in data resources within the bandwidth that is set aside for data.

It can be burdensome for the terminal to have to search through all of the signaling resources within which its own signaling may be found. Various techniques to reduce the search burden have been proposed and will have a beneficial effect when adopted. For instance, it may be possible to reduce the searching burden by half or more by using certain strategies.

The beneficial effect of such strategies could be blunted, however, if additional complexity is introduced to the signaling. For example, additional proposals have been made to use a more complex signaling structure that includes differently sized signaling is used for different terminals in communication with the network element. Such might be used in a case where one terminal is to receive only a single data stream and another terminal is to receive more than one data stream at the same time. Other examples of different payload sizes include, but are not limited to, uplink resource allocation signaling, uplink power control commands, and resource allocations for a downlink shared channel. For the exemplary downlink described below, the possibility of differently sized signaling resources being signaled for different terminals multiplies the search task burden imposed on the terminals.

SUMMARY

It is to be understood that all presented exemplary embodiments may also be used in any suitable combination.

According to a first aspect, a method comprises allocating differing numbers of resource elements to different control channels within a defined signaling structure so that said control channels are allocated different resource payload sizes, at least one resource element of each control channel carrying information for a respective identifier used to detect the control channel, and aggregating the control channels into various aggregations based on signaling rate to reduce decoding complexity and limiting selected resource payload sizes to certain aggregations from among said various aggregations to reduce decoding complexity.

According to a second aspect, a method comprises searching for a control channel by decoding control channels using an identifier, each of the control channels comprising at least one control channel element carrying information for a respective identifier used to detect a control channel of the control channels, wherein the searching of control channels aggregated based on rate is limited by searching for selected resource payload sizes within certain aggregations among said various aggregations to reduce decoding complexity.

According to a third aspect, an apparatus comprises an allocation unit for allocating differing numbers of resource elements to different control channels within a defined signaling structure so that said control channels are allocated different resource payload sizes, at least one resource element of each control channel carrying information for a respective identifier used to detect the control channel; and an aggregation unit for aggregating the control channels into various aggregations based on signaling rate to reduce decoding complexity and limiting selected resource payload sizes to certain aggregations from among said various aggregations to reduce decoding complexity.

According to a fourth aspect, an apparatus comprises a processor configured to allocate differing numbers of resource elements to different control channels within a defined signalling structure so that said control channels are allocated different resource payload sizes, at least one resource element of each control channel carrying information for a respective identifier used to detect the control channel, and to aggregate the control channels into various aggregations based on signalling rate to reduce decoding complexity and limiting selected resource payload sizes to certain aggregations from among said various aggregations to reduce decoding complexity.

According to a fifth aspect, an apparatus comprises means for allocating differing numbers of resource elements to different control channels within a defined signaling structure so that said control channels are allocated different resource payload sizes, at least one resource element of each control channel carrying information for a respective identifier used to detect the control channel; and means for aggregating the control channels into various aggregations based on signaling rate to reduce decoding complexity and limiting selected resource payload sizes to certain aggregations from among said various aggregations to reduce decoding complexity.

According to a sixth aspect, an apparatus comprises a receiver for receiving control channels; and a decoder for searching for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity.

According to a seventh aspect, an apparatus comprises a processor configured to receive control channels, and to search for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity.

According to an eighth aspect, an apparatus comprises means for receiving control channels; and means for searching for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity.

According to a ninth aspect, a computer readable medium comprises program code with code portions for performing the methods according to any one or both (in which case there are at least two such computer readable media) of the first or second aspects when the program is run on a computer processing device.

For any of the first through ninth aspects, a default payload size may be defined for example for a single code word such as a payload size "A" and not limited to any or at least more than one particular size aggregation or aggregations of CCEs.

Similarly, for any of the first through ninth aspects, a payload size defined for a plural code word such as payload size B, greater in payload size than the default payload size A, may be limited by exclusion from at least one aggregation.

Likewise, for any of the first through ninth aspects, a reduced payload size such as payload size C, smaller than the default size A, may be limited by exclusion from at least one aggregation. On the other hand, the payload size C could be limited by exclusion from all but the largest aggregation.

It is to be understood that various payload sizes may be used and also that such may also be used in any suitable combination besides the foregoing examples.

Other objects and features will become apparent from the following detailed description considered in conjunction with the accompanying drawings. It is to be understood, however, that the drawings are designed solely for purposes of illustration and not as a definition of limitation. It should be further

DETAILED DESCRIPTION

The detailed content described below arose in the context of developments underway in the downlink (DL) part of the Third Generation Partnership Program (3GPP) Universal Terrestrial Radio Access Network (UTRAN) long term evolution (LTE) often referred as 3.9G but is not limited to that context.

LTE defines a packet radio system, where all channel allocations are expected to happen in short periods of sub-frames. This is contrary to the older 3G systems, where dedicated signalling channels are necessary to be set up even for packet traffic. It is also different from WLAN (Wireless Local Area Network) type of allocations, where each IP (Internet Protocol) packet transmission contains a transport header.

According to LTE technology, all allocations are signalled in Shared Control Channels, which are present in first multi-carrier symbols of a sub-frame preceding multi-carrier symbols of data channels. The control channels are separately coded. That is, a downlink (or uplink) channel is divided into two separate parts, one for control and one for data. The data part (PDSCH) carries downlink (or uplink) data for simultaneously scheduled users, while the control part (PDCCH) carries (among others) allocation information for the scheduled users. Forward Error Correction (FEC) coding is used (tail-biting convolutional coding).

Figure 1:
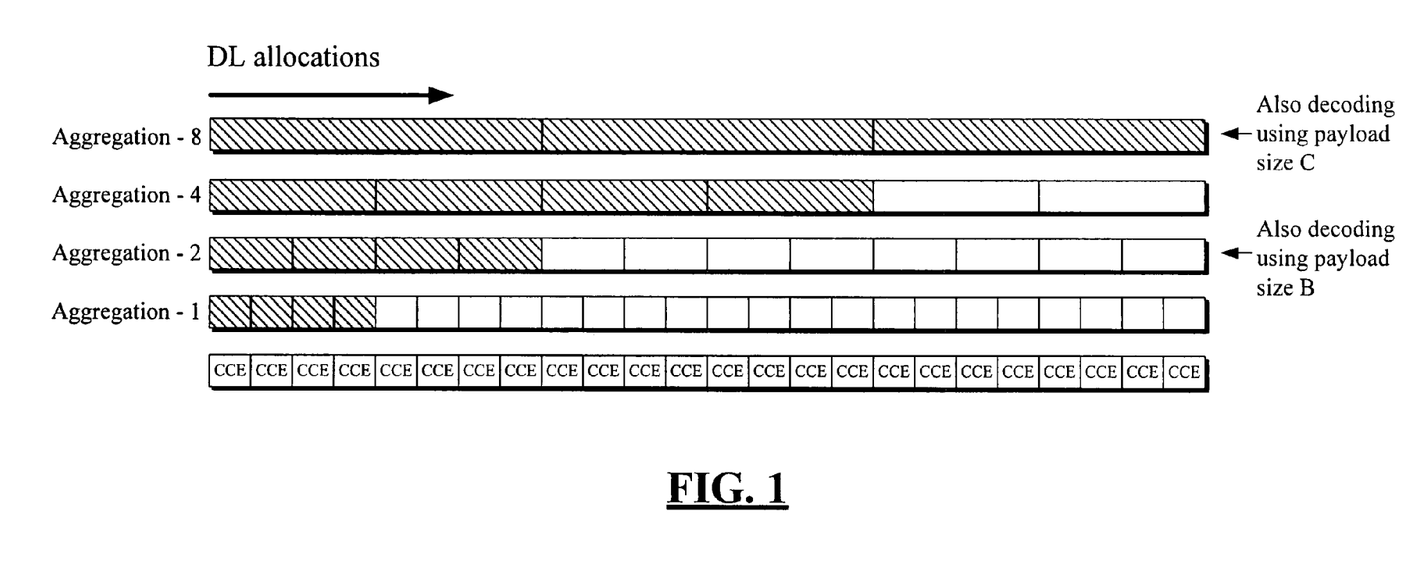
FIG. 1 is an illustration of a reduced decoding tree with use of aggregations limited according to control signaling payload size, according to an embodiment.

A Physical Downlink Shared Control Channel (PDSCCH) which carries (among others) allocation information for simultaneously scheduled users of a communication network system is arranged to a tree structure consisting of multiple control channel elements. A flattened version of such a tree is shown in FIG. 1. See for instance FIG. 7 of R1-071003, 3GPP TSG RAN WG1 #48 Meeting, St. Louis, USA 12-16 Feb. 2007. During decoding, a UE (User Equipment) will combine or aggregate the control channel elements to create different code blocks or control channel candidates. Each code block is called a control channel candidate as it potentially carries information for one MAC (Medium Access Control) ID. The MAC ID is used by the UE or by a group of UEs to detect the channel. At each level of the tree, each node represents a single control channel of a code block. The number of the control channels at the lowest level of the tree is determined by the system bandwidth and number of OFDM symbols n available for the largest code blocks, as well as the size of the control channel elements. Any node of the tree, which is not occupied by a control channel in this level, is available for the next level of the tree as two control channels, each of which are half of the size of the control channel at the parent node.

The system bandwidth consisting of a given number of sub-carrier resources may be divided to an integer multiple of the largest control channels. A given node of the tree i.e. a set of sub-carriers can for instance consist of one control channel of the largest code block, of up to two control channels of the second largest code blocks or up to four control channels of the smallest code blocks.

Each control channel extends entirely over the first n OFDM symbols, which are available for the control channels. The control channels may be distributed to the sub-carriers over the system bandwidth to maximize the frequency diversity.

As each control channel has to be uniquely identified by a MAC ID, it can be combined to CRC (Cyclic Redundancy Code) by partly masking CRC bits with the MAC-ID. As the MAC ID is used for addressing both UE specific control channels and common control channels, it is reasonable to define the MAC ID in a compatible way. Thus, reception of any control channel is possible by filtering control channels with the respective MAC ID. Error detection is available from the MAC ID masked CRC. The length of the MAC ID is matched to the C-RNTI (Cell Radio Network Temporary Identifier) length. The method also comprises allocating differing numbers of resource elements to different control channels within a defined signaling structure so that the control channels are allocated different resource payload sizes. At least one resource element of each control channel carries information for a respective identifier used to detect the control channel. After allocation, the control channels are aggregated into variously sized aggregations of Control Channel Elements (CCEs) based on signaling rate to reduce decoding complexity at the terminals. Further, according to the teachings hereof, selected resource payload sizes may be limited to certain size aggregations from among the various available aggregations in order to further reduce decoding complexity. Once the signaling is setup, it is sent to the terminals from the network element.

As will be appreciated from the foregoing, we concentrate in the embodiments described below on downlink resource allocation signaling on the Physical Downlink Control Channel (PDCCH) but it should be realized that the invention is not limited to the described embodiments or to downlink resource allocation. As suggested above, the resource allocation signaling bits indicate which physical resources are being allocated for a given user. When deciding on the 'way forward' at the last 3GPP meeting (in Athens), a consensus was made (document R1-073870 as well as 3GPP reflector e-mail discussions), indicating that there should potentially be three possible PDCCH payload sizes for indicating downlink resource allocation grants.

These sizes are somewhat different in nature, as they serve different purposes. In this disclosure, we will denote these values: A, B, and C. It should be realized that these sizes are exemplary in nature and may take different forms. A short description of these is given in the following:

A: Normal PDCCH payload signaling, which is intended for a single codeword (single stream) user, which needs full flexibility in terms of freedom for scheduling. This option is to be seen as the default mode of operation, as using it for control channel signaling will provide the option of packet scheduling in the frequency domain.

B: Dual code word user, which is operating two streams at the same time (MIMO). Due to the extra signaling associated to the second codeword, this payload size is larger than A. This control channel signaling is primarily targeted at increasing the peak data rate and throughput for the good channel condition users.

C: Reduced size payload, which will have the same size as an uplink resource grant. However, if this is to be transmitted on the same physical resources as the uplink assignments, we risk causing a larger overhead for the associated uplink control channels. This payload size will be smaller than A. Another example for this reduced payload size could be extremely compact resource allocation signaling for common channels such as dynamic broadcast channels.

A problem in this context is that either the payload sizes that the UE will listen for will have to be restricted, or alternatively the UE will have to attempt to decode a lot of control channels using different rate matching factors to investigate whether it is being scheduled. It should be noted that the exemplary three different payload sizes may have fixed sizes, and that the physical channel capacity may also be fixed for a certain level of aggregation, so there will be a fixed set of rate matching factors to consider when implementing this in a real system.

In the following, we will present a way to reduce the total number of decoding attempts for the PDCCH while still providing flexibility in terms of allowing for multiple payload sizes for the same UE.

For instance an embodiment is to introduce a set of limitations on where the different payload sizes are allowed in a control channel element aggregation 'tree'. Following these limitations, the Node B will have a large flexibility for scheduling users, while the UE will have an option for still keeping the number of blind decoding attempts at a quite low number.

Thus, according to the teachings of a first embodiment hereof, as shown in FIG. 1, a reduced decoding tree is used in such a way that use of its aggregations are limited according to control signaling payload size. It should be noted that the darkest (cross-hatched) areas denotes the control channel elements (and their aggregations) that will potentially be decoded using the default assumption of a payload size of A bits, i.e., all levels of aggregation are available for payload size A searches. As a variation of this embodiment, payload size A could be excluded from one or more aggregation levels but not excluded from at least two aggregation levels.

A user would also investigate control channel candidates at CCE level 2 to investigate whether payload size B was used here since, according to this embodiment, aggregation of signalling having payload size B is limited to aggregation level 2. Similarly, at CCE aggregation level 8, payload size C is also used as an option for searching since, according to this embodiment, aggregation of signalling having payload size C is limited to aggregation level 8. It should be noted that these aggregation levels of 2 and 8 above are merely examples of such limitations. One could also use one or more other levels of aggregation designated for specific control channel payload sizes including sizes not discussed here.

In more detail, considering FIG. 1, it is seen that we have already shown a decoding tree reduction (as mentioned in EP 07107652.5). According to that document, a tree search for aggregated control channels is reduced in a systematic way, which results in a significant reduction of the number of decoding attempts at the UE (User Equipment) side, while still maintaining most of the scheduling flexibility in the eNB (evolved Node B), i.e. a beneficial system spectral efficiency versus UE complexity trade-off is obtained. According further to that document, it was assumed that there would not be a large amount of users having the same propagation conditions being scheduled at the same time. The tree reduction is obtained by putting some limitations on the tree structure by specification. Now, based on the decoding tree, we will make a default assumption that a UE is always scheduled using payload size A. This will be the assumption for all possible control channel candidates.

Now, if we are scheduling a UE, which is about to receive dual code word MIMO, we know that this user is having relatively good channel conditions, and following this, such a user would typically be scheduled using only a few control channel elements. In FIG. 1, we have used an aggregation size of two control channel elements (at aggregation level 2) as the basis for these dual code word transmissions, as already suggested above. We might as well have chosen aggregation level 1 or even both levels 1 and 2 for this. The main thing here is that we use prior knowledge of which propagation conditions we would typically use the payload size B in. In this way, we do not have to search all the way up through the decoding tree for payload size B.

Correspondingly, when considering payload size C, our main argument is that we would typically use this configuration in coverage limited cases (basically we need a lower coding rate of the PDCCH in order to provide better coverage). Thus, it makes little or no sense to schedule a good channel condition use with a payload size of C. Therefore we suggest to limit the possible 'positions' in terms of aggregation levels also in this case to a few or even only a single aggregation level (the highest level 8), i.e., by excluding payload size C from aggregations at levels other than level 8, as already suggested above. Alternatively, payload size C could be excluded from all but the largest sized aggregations of CCEs (e.g., limited to levels 4 and 8).

Using this approach, we have a situation where we increase the total amount of decoding attempts, while at the same time we provide a lot more flexibility in terms of dynamically switching between the different payload sizes.

A default payload size may be defined for example for a single code word such as the above described payload size "A" and not limited to any particular size aggregation or aggregations of CCEs.

A payload size defined for a plural code word such as payload size B, greater in payload size than the default payload size A, may be limited by exclusion from at least one aggregation.

A reduced payload size such as payload size C, smaller than the default size A, may be limited by exclusion from at least one aggregation. On the other hand, the payload size C could be limited by exclusion from all but the largest aggregation. Such may be visualized by referring to FIG. 1 wherein the C sized payload size is limited in the illustrated tree (comprising four aggregation size levels) to aggregation levels of four and eight control channel elements and excluded from aggregation levels of one and two control channel elements.

It is to be understood that the foregoing payload sizes and limitations on allowed aggregations are presented merely as exemplary embodiments that are not by any means exhaustive of the possibilities. It will also be understood that the illustrated aggregations are themselves merely illustrative and may also be used in any suitable combination of aggregations and limited for use by any other suitable payload size according to the teachings hereof.

Figure 2:
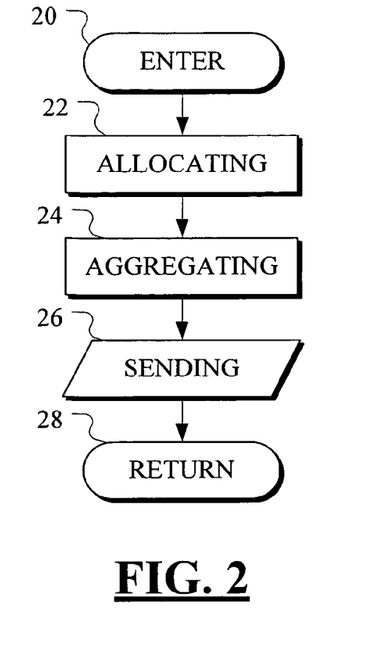
FIG. 2 is a simplified flowchart showing steps that may be carried out in a network element, according to an embodiment.

FIG. 2 is a simplified flowchart showing steps of an exemplary method that may be carried out in a network element, according to the teachings hereof.

After entering in a step 20, the network element allocates resource elements in a step 22 to the terminals and prepares the necessary information for physical downlink control channels (PDCCHs) for carrying scheduling assignments and other control information to the terminals.

In a step 24, a PDCCH is prepared for transmission on a rate-matched aggregation of 1, 2, 4 or 8 control channel elements (CCEs). The size of each of the CCEs could comprise for instance thirty-six resource elements (REs). The available aggregations of CCEs have a tree structure such as shown in flattened form in FIG. 1. Limitations such as described above are introduced on where different payload sizes are allowed in a control channel element aggregation 'tree' such as the flattened tree of FIG. 1. The PDCCHs are FEC encoded and aggregated (rate matched) to the 1, 2, 4 or 8 CCEs. The CCEs of the FEC and rate matched PDCCHs may be placed in a row of possibly different CCE aggregation sizes, possibly with gaps in between due to placement restrictions. Dummy elements may be added so that the PDCCHs occupy the whole space reserved for PDCCH transmission (e.g. the first three symbols of a seven symbol slot of a two slot sub-frame of 0.5 ms duration). The block of bits may be scrambled with a cell specific sequence. The scrambled bits may be QPSK modulated.

The above described downlink resource allocation signaling may for instance use the nomenclature of so-called Downlink Control Information (DCI) that transports control information for one MAC ID which is implicitly signaled in a CRC. Error detection may be provided on DCI transmissions by the cyclic redundancy check (CRC) bits scrambled with the UE identity. After CRC attachment the information bits are convolutionally encoded and rate matched to length of 1, 2, 4 or 8 CCEs. Similar to that already described above there may be different DCI formats that may use different nomenclature than used above that are used for conveying different kinds of information. In similar fashion as that already described above, the sizes of the formats may be bandwidth dependent. In addition there may be several broadcast formats provided, where all UEs are addressed.

The rate matching for the convolutionally encoded control information comprises interleaving a plurality of bit streams followed by a collection of bits from a circular buffer for example. One PDCCH may for instance always produces a bitstream from the rate matching unit that has a length of 1, 2, 4, or 8 CCEs. The control signaling is then sent in a step 26 from the network element over a wireless interface to the terminals and a return is made in a step 28.

The consequence of introducing a set of limitations on where different payload sizes are allowed in a control channel element aggregation 'tree' such as the flattened tree of FIG. 1 and as set forth according to the method of FIG. 2, still gives the network element (e.g., eNode B) a large degree of flexibility for scheduling users, while the terminal (User Equipment) will have an option for keeping the number of blind decoding attempts at a quite low number.

Figure 3:
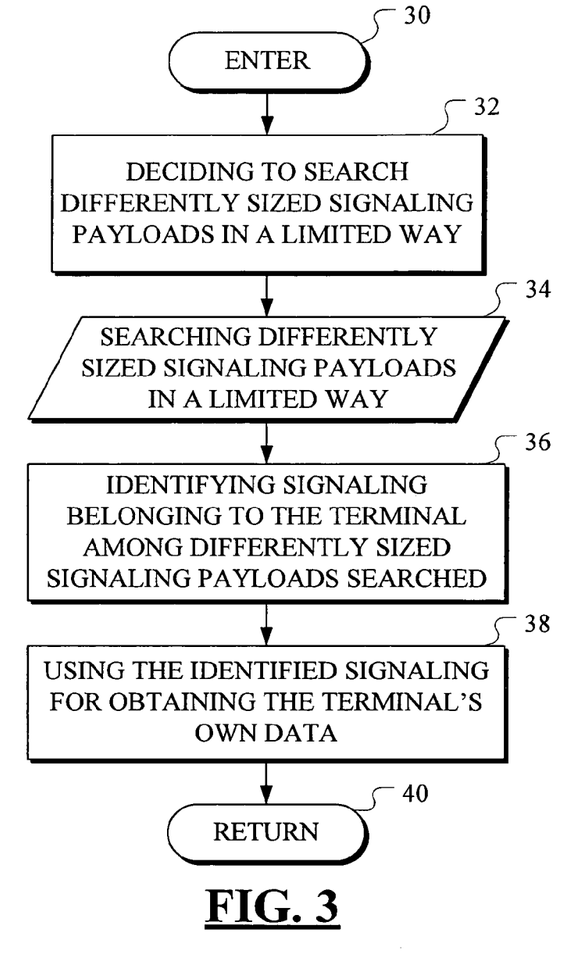
FIG. 3 is a simplified flowchart showing steps that may be carried out in terminal, according to an embodiment.

FIG. 3 is a simplified flowchart showing steps that may be carried out in terminal, according to an embodiment.

Such a method after entry in a step 30 may comprise first of all deciding in a step 32 based on prior knowledge of propagation conditions to search/decode differently sized signaling payloads in a way limited as shown for instance in FIG. 1 to certain aggregation levels such as level 2 using payload size B or level 8 using payload size C in the presence of certain corresponding propagation conditions. The terminal then searches differently sized signalling payloads in the decided upon limited way for a control channel intended for it by decoding control channels using an identifier belonging to it as shown in a step 34. Each of the control channels will comprise at least one control channel element carrying information for a respective terminal identifier used to detect a control channel of the control channels. The searching of control channels may be of various aggregations limited in the scope of the search based on rate. Such a search may for instance be limited by searching for selected resource payload sizes expected to be found within certain aggregations among the various aggregations to reduce decoding complexity. The terminal may then succeed in more easily and quickly identifying signaling belonging to the terminal among the differently sized signaling payloads that are searched/decoded as shown in a step 36. If so identified as shown in a step 38, the identified signaling may then be used by the terminal for finding, demodulating and decoding its own data arriving from the network element on identified data resources. The step 38 may be followed by a step 39.

Figure 4:
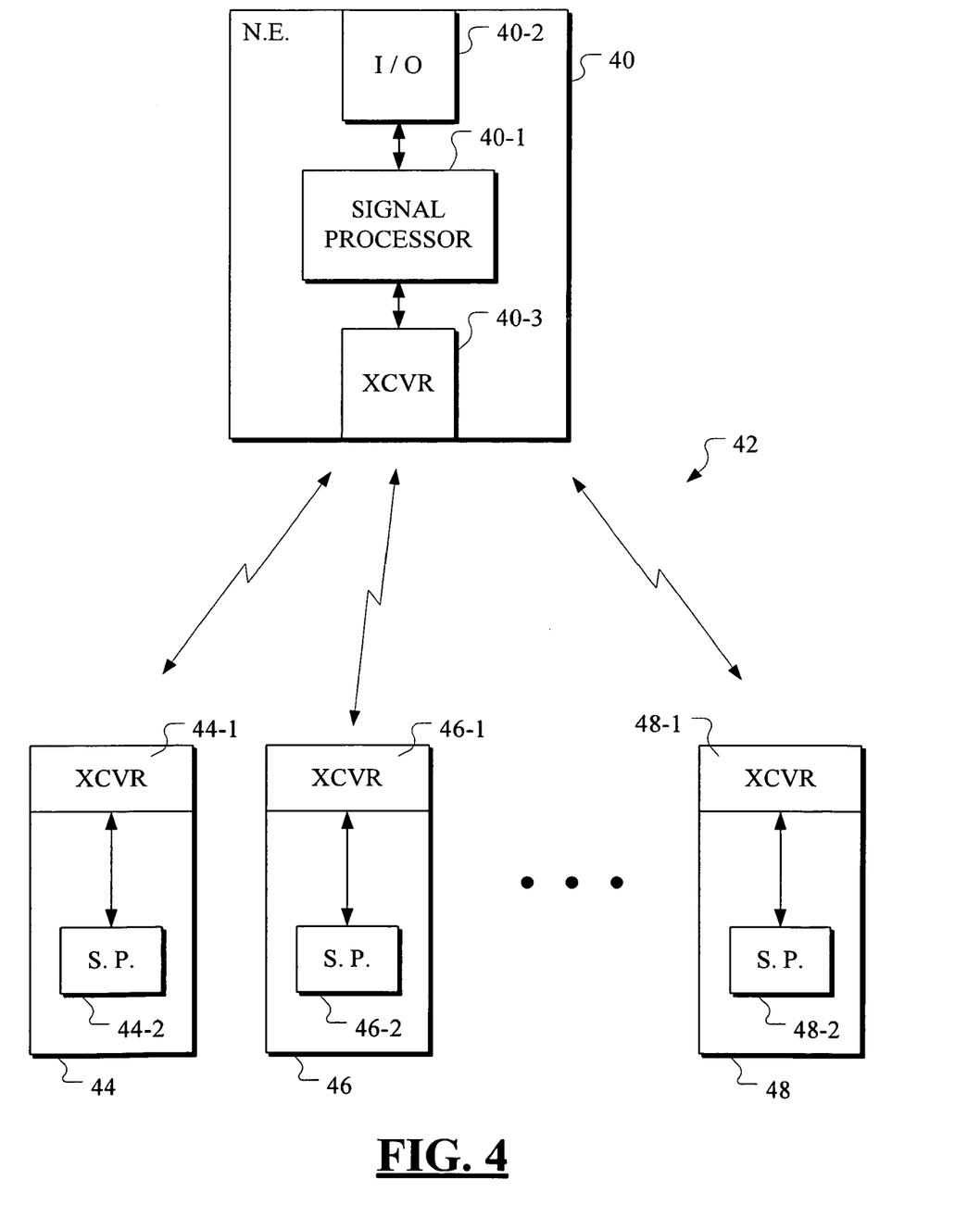
FIG. 4 shows a system, according to an embodiment.
Figure 5:
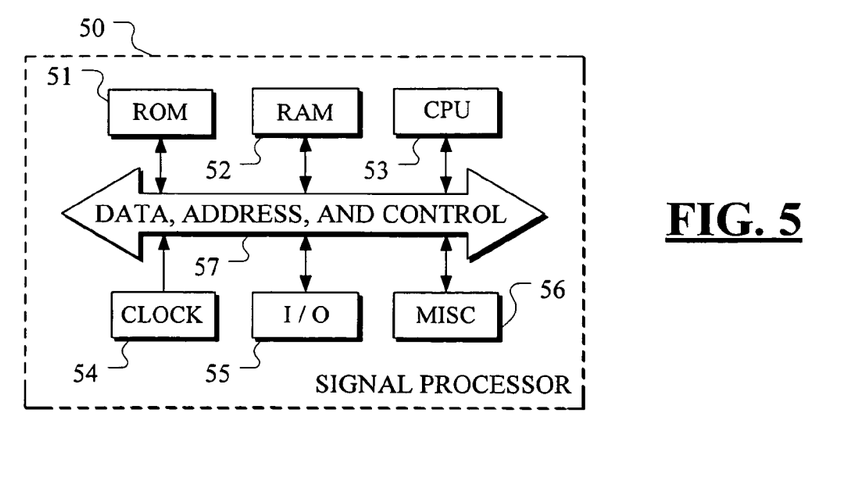
FIG. 5 shows a signal processor suitable for use in the terminal, the network element, or both.

FIG. 4 shows a system, according to an embodiment. A network element 40 is shown with a signal processor 40-1 connected to an input/output (I/O) port 40-2 for interfacing with a core network and connected to a transceiver (XCVR) 40-3 with which the signal processor may communicate such as wirelessly 42 as shown with various terminals 44, 46, 48 in this case mobile stations (user equipment). The signal processor 40-1 may be as shown in FIG. 5 and may execute program code in order to carry out a method such as shown in FIG. 2. As such, the processor or the network element apparatus including the processor comprises means for allocating differing numbers of resource elements to different control channels within a defined signaling structure so that said control channels are allocated different resource payload sizes, at least one resource element of each control channel carrying information for a respective identifier used to detect the control channel, and including means for aggregating the control channels into various aggregations based on signaling rate to reduce decoding complexity and limiting selected resource payload sizes to certain aggregations from among said various aggregations to reduce decoding complexity.

Each of the terminals is shown with a corresponding transceiver 44-1, 46-1, 48-1 connected to a signal processor 44-2, 46-2, 48-2. The signal processor in each terminal may also be as shown in FIG. 5 and may execute program code in order to carry out a method such as shown in FIG. 3. As such, the processor or terminal apparatus including the processor comprises means for receiving control channels, and also includes means for searching for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity.

FIG. 5 shows a signal processor 50 such as may be used as the processors 40-1, 44-2, 46-2, 48-2 of FIG. 4 suitable for use in the terminals 44, 46, 48, the network element 40, or both. As such it may comprise a general purpose signal processor suitable for carrying out the signal processing functions shown above. As such it might include a read-only-memory (ROM) 51, a random access memory (RAM) 52, a central processing unit (CPU) 53, a clock 54, an input/output (I/O) port 55, and miscellaneous functions 56, all interconnected by data, address and control (DAC) busses 57. The ROM is a computer readable medium that is able to store program code written to carry out the various functions described above in connection with FIGS. 2 and 3 in conjunction with the RAM, CPU, I/O, etc. Of course, it should be realized that the same signal processing function may be carried out with a combination of hardware and software and may even be carried out entirely in hardware with a dedicated integrated circuit, i.e., without software. In that case, the signal processor 50 may also be one or more integrated circuits, i.e., a so-called "chipset" with the above described functionality carried out on a number of inter-related integrated circuits and possibly also software signal processors. Likewise, a computer readable medium embodying program code for carrying out the methods of FIG. 2 or 3 may be constituted by a memory device other than the ROM 51 in the processor of FIG. 5 and may instead comprise one or more separate memory devices.

What is claimed is:

1. A method comprising:
    allocating differing numbers of resource elements to different control channels within a defined signalling structure so that said control channels are allocated different resource payload sizes, at least one resource element of each control channel carrying information for a respective identifier used to detect the control channel, and
    aggregating the control channels including user equipment specific control channels and common control channels into various aggregation levels with common control channels limited by exclusion from at least one aggregation level of said various aggregation levels, wherein said common control channels are limited in a tree comprising four aggregation levels to aggregation levels of four and eight control channel elements and excluded from aggregation levels of one and two control channel elements.

2. The method of claim 1, wherein a default payload size is for a single code word not limited to any aggregation level.

3. The method of claim 2, wherein a payload size is defined for a plural code word greater in payload size than said default payload size and limited by exclusion from at least one aggregation level.

4. The method of claim 2, wherein a reduced payload size smaller than said default size is for said common control channels.

5. A method comprising:
    allocating differing numbers of resource elements to different control channels within a defined signalling structure so that said control channels are allocated different resource payload sizes, at least one resource element of each control channel carrying information for a respective identifier used to detect the control channel, and
    aggregating the control channels into various aggregations based on signalling rate to reduce decoding complexity and limiting selected resource payload sizes to certain aggregations from among said various aggregations to reduce decoding complexity, wherein a default payload size is for a single code word not limited to any or at least more than one aggregation, wherein at least one payload size is limited by exclusion from at least one aggregation, and wherein said at least one payload size limited by exclusion from at least one aggregation is limited in a tree comprising four aggregation levels to aggregation levels of four and eight control channel elements and excluded from aggregation levels of one and two control channel elements.

6. The method of claim 5, wherein said at least one payload size limited by exclusion from at least one aggregation is limited from all but the largest aggregation.

7. A non-transitory computer readable medium comprising program code with code portions for performing the method of claim 5 when the program is run on a computer processing device.

8. A method comprising:
    searching for a control channel by decoding control channels using an identifier, each of the control channels comprising at least one control channel element carrying information for a respective identifier used to detect a control channel of the control channels,
    wherein the control channels include user equipment specific control channels and common control channels that are aggregated in various aggregation levels with common control channels limited by exclusion from at least one aggregation level of said various aggregation levels, wherein said common control channels are limited in a tree comprising four aggregation levels to aggregation levels of four and eight control channel elements and excluded from aggregation levels of one and two control channel elements.

9. The method of claim 8, wherein a default payload size is for a single code word not limited to any aggregation level.

10. The method of claim 9, wherein a payload size is defined for a plural code word greater in payload size than said default payload size and limited by exclusion from at least one aggregation level.

11. The method of claim 9, wherein a reduced payload size smaller than said default size is for said common control channels.

12. A method comprising:
    searching for a control channel by decoding control channels using an identifier, each of the control channels comprising at least one control channel element carrying information for a respective identifier used to detect a control channel of the control channels,
    wherein the control channels are aggregated in various aggregations based on rate and wherein the searching of control channels aggregated based on rate is limited by searching for selected resource payload sizes within certain aggregations among said various aggregations to reduce decoding complexity, wherein a default payload size is for a single code word not limited to any or at least more than one aggregation, wherein at least one payload size is limited by exclusion from at least one aggregation, and wherein said at least one payload size limited by exclusion from at least one aggregation is limited in a tree comprising four aggregation levels to aggregation levels of four and eight control channel elements and excluded from aggregation levels of one and two control channel elements.

13. The method of claim 12, wherein said at least one payload size limited by exclusion from at least one aggregation is limited from all but the largest aggregation.

14. A non-transitory computer readable medium comprising program code with code portions for performing the method of claim 12 when the program is run on a computer processing device.

15. An apparatus comprising
    at least one processor
    and at least one memory including computer program code
    the at least one memory and the computer program code configured to, with the processor, cause the apparatus at least to:
    allocate differing numbers of resource elements to different control channels within a defined signalling structure so that said control channels are allocated different resource payload sizes, at least one resource element of each control channel carrying information for a respective identifier used to detect the control channel; and
    aggregate the control channels including user equipment specific control channels and common control channels into various aggregation levels with common control channels limited by exclusion from at least one aggregation level of said various aggregation levels, wherein said common control channels are limited in a tree comprising four aggregation levels to aggregation levels of four and eight control channel elements and excluded from aggregation levels of one and two control channel elements.

16. The apparatus of claim 15, wherein a default payload size is for a single code word not limited to any aggregation level.

17. The apparatus of claim 16, wherein a payload size is defined for a plural code word greater in payload size than said default payload size and limited by exclusion from at least one aggregation level.

18. An apparatus comprising
at least one processor
and at least one memory including computer program code
the at least one memory and the computer program code configured to, with the processor, cause the apparatus at least to:
allocate differing numbers of resource elements to different control channels within a defined signalling structure so that said control channels are allocated different resource payload sizes, at least one resource element of each control channel carrying information for a respective identifier used to detect the control channel; and
aggregate the control channels into various aggregations based on signalling rate to reduce decoding complexity and limiting selected resource payload sizes to certain aggregations from among said various aggregations to reduce decoding complexity, wherein a default payload size is for a single code word not limited to any or at least more than one aggregation, and wherein a reduced payload size smaller than said default payload size is limited by exclusion from at least one aggregation.

19. The apparatus of claim 18, wherein at least one payload size is limited by exclusion from at least one aggregation.

20. An apparatus comprising
at least one processor
and at least one memory including computer program code
the at least one memory and the computer program code configured to, with the processor, cause the apparatus at least to:
allocate differing numbers of resource elements to different control channels within a defined signalling structure in that said control channels are allocated different resource payload sizes, at least one resource element of each control channel carrying information for a respective identifier used to detect the control channel; and
aggregate the control channels into various aggregations based on signalling rate to reduce decoding complexity and limiting selected resource payload sizes to certain aggregations from among said various aggregations to reduce decoding complexity, wherein a default payload size is for a single code word not limited to any or at least more than one aggregation, wherein at least one payload size is limited by exclusion from at least one aggregation, and wherein said at least one payload size limited by exclusion from at least one aggregation is limited, in a tree comprising four aggregation levels, to aggregation levels of four and eight control channel elements and excluded from aggregation levels of one and two control channel elements.

21. The apparatus of claim 20, wherein said at least one payload size limited by exclusion from at least one aggregation is limited from all but the largest aggregation.

22. An apparatus comprising
at least one processor
and at least one memory including computer program code
the at least one memory and the computer program code configured to, with the processor, cause the apparatus at least to:
receive control channels; and
search for a control channel by decoding received control channels using an identifier, each of the control channels comprising at least one control channel element carrying information for a respective identifier used to detect a control channel of the control channels, wherein the control channels include user equipment specific control channels and common control channels that are aggregated in various aggregation levels with common control channels limited by exclusion from at least one aggregation level of said various aggregation levels, wherein said common control channels are limited in a tree comprising four aggregation levels to aggregation levels of four and eight control channel elements and excluded from aggregation levels of one and two control channel elements.

23. The apparatus of claim 22, wherein a default payload size is for a single code word not limited to any aggregation level.

24. An apparatus comprising
at least one processor
and at least one memory including computer program code
the at least one memory and the computer program code configured to, with the processor, cause the apparatus at least to:
receive control channels; and
search for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity, wherein a default payload size is for a single code word not limited to any or at least more than one aggregation, and wherein a reduced payload size smaller than said default size is limited by exclusion from at least one aggregation.

25. An apparatus comprising
at least one processor
and at least one memory including computer program code
the at least one memory and the computer program code configured to, with the processor, cause the apparatus at least to:
receive control channels; and
search for a control channel by decoding received control channels using an identifier, each of the control channels comprising at least one control channel element carrying information for a respective identifier used to detect a control channel of the control channels, wherein the control channels are aggregated based on rate and said searching of the control channels aggregated based on rate is limited by searching for selected resource payload sizes within certain aggregations among said various aggregations to reduce decoding complexity, wherein a default payload size is for a single code word not limited to any or at least more than one aggregation, wherein at least one payload size is limited by exclusion from at least one aggregation, and wherein said at least one payload size limited by exclusion from at least one aggregation is limited, in a tree comprising four aggregation levels, to aggregation levels of four and eight control channel elements and excluded from aggregation levels of one and two control channel elements.

26. The apparatus of claim 25, wherein said at least one payload size limited by exclusion from at least one aggregation is limited from all but the largest aggregation.

27. An apparatus comprising:
means for allocating differing numbers of resource elements to different control channels within a defined signaling structure in that said control channels are allocated different resource payload sizes, at least one resource element of each control channel carrying information for a respective identifier used to detect the control channel; and
means for aggregating the control channels into various aggregations based on signaling rate to reduce decoding complexity and limiting selected resource payload sizes to certain aggregations from among said various aggregations to reduce decoding complexity wherein a default payload size is for a single code word not limited to any or at least more than one aggregation, wherein at least one payload size is limited by exclusion from at least one aggregation, and
wherein said at least one payload size limited by exclusion from at least one aggregation is limited in a tree comprising four aggregation levels to aggregation levels of four and eight control channel elements and excluded from aggregation levels of one and two control channel elements.

28. An apparatus comprising:
means for receiving control channels; and
means for searching for a control channel by decoding received control channels using an identifier, each of the control channels comprising at least one control channel element carrying information for a respective identifier used to detect a control channel of the control channels, wherein the control channels are aggregated in various aggregations based on rate and said searching of the control channels aggregated based on rate is limited by searching for selected resource payload sizes within certain aggregations among said various aggregations to reduce decoding complexity,
wherein a default payload size is for a single code word not limited to any or at least more than one aggregation,
wherein at least one payload size is limited by exclusion from at least one aggregation, and
wherein at least one payload size is limited by exclusion from at least one aggregation, wherein said at least one payload size limited by exclusion from at least one aggregation is limited in a tree comprising four aggregation levels to aggregation levels of four and eight control channel elements and excluded from aggregation levels of one and two control channel elements.

* * * * *